United States Patent Office 3,386,880
Patented June 4, 1968

3,386,880
PROCESS OF FORMING PAPER CONTAINING POLYETHYLENEIMINE CROSS-LINKED WITH METHYLENE-BIS-ACRYLAMIDE AND PAPER THEREOF
Harold Lomas, Dundas, Ontario, Canada, assignor to Ontario Research Foundation, Toronto, Ontario, Canada
No Drawing. Filed Mar. 22, 1965, Ser. No. 441,868
7 Claims. (Cl. 162—168)

ABSTRACT OF THE DISCLOSURE

The wet strength properties of paper can be improved by the incorporation of polyethyleneimine which is cross-linked with methylene-bis-acrylamide. The polyethyleneimine has a molecular weight in its uncross-linked form of greater than about 10,000. The cross-linked polyethyleneimine is provided in the paper by a process wherein a cellulose paper making stock having uncross-linked polyethyleneimine of a molecular weight greater than 10,000 adsorbed therein is provided. Methylene-bis-acrylamide is then added to the stock as cross-linking agent for the polyethyleneimine and the treated paper stock is dried to both cross-link the polyethyleneimine with the methylene-bis-acrylamide and to form a paper product.

---

This invention relates to processes for the manufacture of paper having a high wet strength, and also to the product produced thereby.

A number of cationic, water-soluble resins have been proposed for and applied as wet-strength additives for paper. These include ureaformaldehyde resins, melamine-formaldehyde resins, cationic starch, polacrylamide-acrylic acid copolymers, and polyamide-amine-epichlorohydrin condensates. Generally, in order to give a satisfactory increase in wet strength, some degree of cross-linking of the resins is necessary, but, in order to give their maximum effect, the resins should be adsorbed on the cellulose in their linear or low molecular weight form, and cross-linking should take place after adsorption is complete. This allows maximum penetration of the resin into the cellulose micelles.

With most resins of the type hereinbefore noted, cross-linking is accomplished by a curing or ageing process that involves heating the paper, or storing it for some time. A heating step is both time consuming and costly, and storage is undesirable for obvious reasons.

It also is significant that many of the resins employed in the past to impart wet strength to paper must be applied to the paper, or paper-making stock, from an acid solution. This is undesirable, since the paper or paper-making stock may contain alkaline fillers, and, furthermore, any acid left in the paper would tend to weaken the paper with age.

Polyethyleneimine has been proposed as an additive to increase the wet strength of paper, and, indeed, has been found to impart an appreciable degree of wet strength to paper. However, although its highly cationic nature permits it to be readily adsorbed on cellulose fibres, it does not readily cross-link. It has been postulated that this factor may account for the lower wet strength imparted to paper by polyethyleneimine, as compared with the degree of wet strength imparted by other types of cross-linked resins.

In accordance with this invention, it has been discovered that polyethyleneimine can be cross-linked, and that the cross-linked polyethyleneimine imparts a high degree of wet strength to paper.

One feature of this invention is that the polyethyleneimine may be applied to a paper-making stock from a neutral or alkaline solution, thereby avoiding the disadvantages inherent in applying a wet strength imparting resin to a paper-making stock from an acid solution, although an acid solution may be employed, if the foregoing disadvantages are tolerable.

Another feature of this invention is that it has been discovered that curing or ageing of the adsorbed polyethyleneimine for the purpose of cross-linking the resin by heating or storing the produced paper is not essential, and, indeed, that a satisfactory degree of cross-linking can be obtained during the manufacture of the paper by a paper machine followed by normal drying.

In brief, in accordance with this invention there is provided a paper containing cross-linked polyethyleneimine having a molecular weight in its uncross-linked form greater than about 10,000, and preferably between 30,000 and 40,000.

Also, in accordance with this invention there is provided a process for producing paper of high wet strength wherein a cellulose paper-making stock having adsorbed polyethyleneimine thereon of a molecular weight greater than about 10,000 is treated with a cross-linking agent to cross-link the polyethyleneimine and then is dried to form a paper.

In accordance with this invention it has been discovered that polyethyleneimine adsorbed on the cellulose fibres of a paper-making stock can be cross-linked by the use of a suitable cross-linking agent to impart a high degree of wet strength to the resultant paper product. A number of cross-linking agents may be employed for the purpose, but best results have been obtained using methylene-bis-acrylamide. This cross-linking agent is bi-functional, both double bonds being able to react with NH groups by an alkylation method. It should be noted, however, that methylene-bis-acrylamide is not substantive to cellulose. Therefore, the cross-linking agent should be applied separate from the polyethyleneimine rather than in aqueous solution with the resin. Thus, the cross-linking agent, which is a solid, may be applied by being dissolved in a suitable solvent, such as water, for example, and sprayed on to the partially dried fiber web containing adsorbed polyethyleneimine, or the dried paper web containing the polyethyleneimine may be dipped into a solution of methylene-bis-acrylamide. If the methylene-bis-acrylamide is applied in aqueous solution with the resin, e.g., in the beaters, it will tend to remain in solution.

The polyethyleneimine (uncross-linked) used in the practice of this invention should have a molecular weight greater than about 10,000, and preferably between 30,000 and 40,000. It is preferable to apply the polyethyleneimine in aqueous solution to an aqueous, cellulose, paper-making stock, the resultant slurry being neutral or alkaline, preferably. The polyethyleneimine may be mixed with and adsorbed by the stock in the stock beaters prior to introduction of the stock into the head box of a paper machine. Other methods of applying the polyethyleneimine are possible, of course.

The amount of polyethyleneimine so applied may vary widely, but preferably from about 0.5% to 2% by weight based on the bone dry weight of the paper should be employed. Less than 0.5% may be employed, but the paper then will have a lower wet strength than would be obtained if the amount of polyethyleneimine were within the preferred range. More than 2% may be employed, but no appreciable increase in wet strength has been found by increasing the polyethyleneimine content above the 2% level, and it will be appreciated, of course, that the greater the amount of polyethyleneimine employed, the greater the consequent cost.

The amount of methylene-bis-acrylamide employed also may vary widely, but preferably is between 0.1% and 1% by weight based on the bone dry weight of the paper. It should be noted, however, that less than 0.1% can be employed with some reduction in the degree of cross-linking, and while more than 1% may be used, it probably is not economic to do so.

If this invention is carried out while the paper is being manufactured, after the fiber web containing adsorbed polyethyleneimine has been formed on the wire screen of a Fourdrinier paper machine, the methylene-bis-acrylamide in aqueous solution may be sprayed on to the partial dried fiber web at the "dry" end of the wire screen. In such a case it has been found that the cross-linking reaction between the polyethyleneimine and the methylene-bis-acrylamide takes place during the drying of the paper as it passes through the dryer roller section of the paper machine, so a curing or ageing process, which usually is necessary with conventional resins, is not necessary in this instance.

It will be seen from the foregoing that the product of this invention is a paper containing cross-linked polyethyleneimine having a molecular weight in its uncross-linked form greater than about 10,000, and preferably between 30,000 and 40,000. The cross-linking agent preferably is methylene-bis-acrylamide, which preferably is employed in an amount between 0.1% and 1% by weight based on the bone dry weight of the paper. The amount of polyethyleneimine (uncross-linked) employed preferably is between 0.5% and 2% based on the bone dry weight of the paper.

It also will be seen from the foregoing that, in accordance with the broad aspect of this invention, a paper exhibiting a high degree of wet strength is produced by providing a cellulose, papermaking stock having adsorbed polyethyleneimine thereon of a molecular weight greater than about 10,000, cross-linking the polyethyleneimine, preferably by methylene-bis-acrylamide, and drying the treated paper stock to form a paper.

This process may be carried out conveniently as a part of the paper-making operation by mixing the polyethyleneimine with an aqueous, cellulose, paper-making stock in the beaters, for example, forming the stock into a web by depositing the same from the head box of a paper machine onto its wire screen, removing some of the water from the web by suction boxes, foils or the like, applying a cross-linking agent to the partially dried web for cross-linking the polyethyleneimine adsorbed thereon, and then drying the web in the dryer section of the paper machine.

The following example is illustrative of this invention:

EXAMPLE 1.0 g. of a 50% aqueous solution of polyethyleneimine was diluted to 50 ml., the pH adjusted to 7, and the solution diluted to 100 ml. Bleached sulphite pulp (360 g. dry weight) was soaked in 5 litres of water overnight. After adding another 5 litres of water, the pulp was disintegrated with a mixer for 10 min. and transferred to a 1½ lb. beater (TAPPI method T200–ts–61), together with 13 litres of water, to give a consistency of 1.57%. The pulp was beaten to a freeness of 525 cc. at 20° C., and 800 ml. aliquots were taken and treated in the following manner:

(1) An 800 ml. aliquot was diluted to 2 litres with water, disintegrated for 5 min., the pH adjusted to 7, disintegrated a further 5 min. and diluted to 8 litres with water of pH 7. Handsheets were made using a British sheet machine (TAPPI method T205–m–58).

(2) A second 800 ml. aliquot was treated as in 1, and 25 ml. of the polyethyleneimine solution added after the first 5 min. disintegration. The pulp slurry again was disintegrated and handsheets made in the usual manner.

(3) A third 800 ml. aliquot was treated as in 2, but with 50 ml. polyethyleneimine solution.

Each set of handsheets was divided into three parts. One was left untreated, and the other two were treated with a 1% aqueous solution of methylene-bis-acrylamide by dipping and pressing between clean blotting paper. One half of the treated sheets were air dried, and the other half were heated in an oven at 105° C. for 40 min. The sheets then were conditioned at 70° C. and 50% relative humidity overnight and cut into 15 mm. strips for tensile tests in an "Instron" (trademark) tensile machine. Half of each set of strips were tested in the dry state, and the other half were dipped in water for 10 min. before testing. Similar tests were made using a 0.1% aqueous solution of methylene-bis-acrylamide. Results are shown in the following Table I.

TABLE I

| | Sheet No. | Dry Reading (Kg.) | | | Wet Reading (Kg.) | | | Wet Treated Dry (Percent) ×100 | Wet Untreated Dry (Percent) ×100 |
|---|---|---|---|---|---|---|---|---|---|
| | | 1 | 2 | Average | 1 | 2 | Average | | |
| No polyethyleneimine: | | | | | | | | | |
| Untreated, 0% (not cured) | 1a | 3.50 | 3.43 | 3.40 | 0.13 | 0.14 | 0.14 | | 4.1 |
| | 1b | 3.45 | 3.23 | | 0.15 | 0.15 | | | |
| Treated with M.B.A.: | | | | | | | | | |
| 1% (not cured) | 1c | 3.45 | 2.70 | 2.42 | 0.15 | 0.15 | 0.145 | 6.0 | 4.1 |
| | 1d | 2.08 | 2.46 | | 0.14 | 0.14 | | | |
| 1% (cured) | 1e | 3.63 | 2.56 | 2.23 | 0.17 | 0.17 | 0.16 | 7.2 | 4.7 |
| | 1f | 2.07 | 1.65 | | 0.14 | 0.15 | | | |
| 1% polyethyleneimine: | | | | | | | | | |
| Untreated, 0% (not cured) | 2a | 4.52 | 4.53 | 4.53 | 0.65 | 0.67 | 0.65 | 14.4 | 19.1 |
| | 2b | 4.45 | 4.63 | | 0.65 | 0.64 | | | |
| Treated with M.B.A.: | | | | | | | | | |
| 1% (not cured) | 2c | 4.98 | 5.02 | 5.14 | 1.05 | 1.02 | 1.06 | 20.6 | 31.3 |
| | 2d | 5.23 | 5.34 | | 1.11 | 1.07 | | | |
| 1% (cured) | 2e | 5.15 | 5.12 | 5.17 | 1.13 | 1.10 | 1.14 | 22.1 | 33.6 |
| | 2f | 4.95 | 5.45 | | 1.13 | 1.21 | | | |
| 0.1% (cured) | 2g | | | 5.63 | | | 1.29 | 23.0 | 38.0 |
| 2% polyethyleneimine: | | | | | | | | | |
| Untreated, 0% (not cured) | 3a | 4.25 | 4.45 | 4.56 | 0.78 | 0.79 | 0.81 | 17.8 | 23.8 |
| | 3b | 4.77 | 4.75 | | 0.83 | 0.83 | | | |
| Treated with M.B.A.: | | | | | | | | | |
| 1% (not cured) | 3c | 5.83 | 6.05 | 5.85 | 1.53 | 1.60 | 1.55 | 26.4 | 45.5 |
| | 3d | 5.80 | 5.70 | | 1.52 | 1.55 | | | |
| 1% (cured) | 3e | 5.75 | 6.03 | 5.85 | 1.59 | 1.66 | 1.56 | 26.7 | 45.9 |
| | 3f | 5.94 | 5.67 | | 1.55 | 1.45 | | | |
| 0.1% (cured) | 3g | | | 5.70 | | | 1.49 | 26.2 | 43.9 |

M.B.A.=methylene-bis-acrylamide.

From Table I it will be seen, by comparing the results obtained when paper was treated with polyethyleneimine with and without a cross-linking agent, that the cross-linked polyethyleneimine contributed an appreciable increase in wet strength to the paper, as well as increasing the dry strength thereof. It also will be noted that slightly higher wet strengths were obtained employing 2% polyethyleneimine than 1% polyethyleneimine, but that there was very little difference in wet strength when the amount of methylene-bis-acrylamide employed was varied from 0.1% to 1%. It also will be noted that curing of the resin did not substantially increase the wet strength thereof as opposed to air dried samples.

While preferred embodiments of this invention have been disclosed herein, those skilled in the art will appreciate that changes and modifications may be made therein without departing from the spirit and scope of this invention as defined in the appended claims.

What I claim as my invention is:

1. A paper containing polyethyleneimine cross-linked with methylene-bis-acrylamide, the polyethyleneimine having a molecular weight in its uncross-linked form greater than about 10,000, the methylene-bis-acrylamide being present in amount of from about 0.1 to 1% by weight based on the dry weight of the paper.

2. A paper according to claim 1 wherein the molecular weight of the polyethyleneimine in its uncross-linked form is between 30,000 and 40,000.

3. A paper containing from about 0.5% to 2% by weight based on the dry weight of the paper and calculated as uncross-linked polyethyleneimine of cross-linked polyethyleneimine having a molecular weight in its uncross-linked form greater than about 10,000 and cross-linked by from about 0.1% to 1% by weight based on the dry weight of the paper of methylene-bis-acrylamide.

4. A paper according to claim 3 wherein the molecular weight of the polyethyleneimine in its uncross-linked form is between 30,000 and 40,000.

5. A process for producing paper of high wet strength which comprises; mixing polyethyleneimine having a molecular weight greater than 10,000 with an aqueous cellulose papermaking stock, forming the stock into a web, removing some of the water from the web, applying from about 0.1 to 1% by weight of methylene-bis-acrylamide, based on the dry weight of the paper, to the partially dried web, and drying the web to cross-link the polyethyleneimine with said methylene-bis-acrylamide to form a paper.

6. A process according to claim 5 wherein the amount of said polyethyleneimine is between about 0.5 and 2% by weight based on the dry weight of the paper.

7. A process according to claim 5 wherein said stock is formed into said web on the wire screen of a Fourdrinier paper machine and said cross-linking agent is applied to said web adjacent the dry end of said wire screen.

References Cited
UNITED STATES PATENTS

| | | | |
|---|---|---|---|
| 2,801,169 | 7/1957 | Lundberg et al. | 162—168 |
| 3,052,669 | 9/1962 | Gavlin et al. | 162—164 |

FOREIGN PATENTS 467,655   12/1951   Italy.

S. LEON BASHORE, *Primary Examiner.*